US010284605B2

(12) United States Patent
Baek et al.

(10) Patent No.: US 10,284,605 B2
(45) Date of Patent: May 7, 2019

(54) METHOD AND TERMINAL FOR PROVIDING MCPTT SERVICE

(71) Applicant: Samsung Electronics Co., Ltd., Gyeonggi-do (KR)

(72) Inventors: Yun-sun Baek, Gyeonggi-do (KR); Duk-gu Sung, Seoul (KR); Kill-yeon Kim, Gyeonggi-do (KR); Jae-woong Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/722,670

(22) Filed: Oct. 2, 2017

(65) Prior Publication Data
US 2018/0097850 A1 Apr. 5, 2018

Related U.S. Application Data

(60) Provisional application No. 62/402,502, filed on Sep. 30, 2016.

(30) Foreign Application Priority Data

Jul. 26, 2017 (KR) .................. 10-2017-0094971

(51) Int. Cl.
H04M 3/42 (2006.01)
H04L 29/06 (2006.01)
H04M 3/487 (2006.01)

(52) U.S. Cl.
CPC ...... H04L 65/1016 (2013.01); H04L 65/1059 (2013.01); H04L 65/1063 (2013.01);
(Continued)

(58) Field of Classification Search
CPC ............. H04L 65/1016; H04L 65/1063; H04L 65/1069; H04L 65/1083; H04L 65/1096;
(Continued)

(56) References Cited

U.S. PATENT DOCUMENTS 6,986,158 B1 * 1/2006 Terui .................. H04N 21/2402
375/240.26
8,478,776 B2 7/2013 Walton et al.
(Continued)

FOREIGN PATENT DOCUMENTS

JP 2016-521483 7/2016
KR 1020120088791 8/2012
(Continued)

OTHER PUBLICATIONS

Korean Office Action dated May 21, 2018 issued in counterpart application No. 10-2017-0094971, 5 pages.
(Continued)

Primary Examiner — Khai N. Nguyen
(74) Attorney, Agent, or Firm — The Farrell Law Firm, P.C.

(57) ABSTRACT

A method and an apparatus for providing a mission critical service are provided. The method includes transmitting, by the first terminal, a first discovery announcement message to plurality of terminals performing device to device (D2D) communication according to the mission critical service, wherein the discovery announcement message includes at least one of a category of the first terminal, video performance of a camera provided in the first terminal, and information about a status of the first terminal; receiving a second discovery announcement message from a second terminal included among the plurality of terminals performing the D2D communication; and acquiring information about a presence and a capability of the second terminal based on the second discovery announcement message.

19 Claims, 13 Drawing Sheets

(52) U.S. Cl.
CPC ...... *H04L 65/1069* (2013.01); *H04L 65/1083* (2013.01); *H04L 65/4061* (2013.01); *H04M 3/42* (2013.01); *H04L 65/1096* (2013.01); *H04M 3/487* (2013.01)

(58) Field of Classification Search
CPC ......... H04M 1/72563; H04M 1/72566; H04M 3/42; H04M 3/42365; H04M 2242/00; H04M 2242/02; H04M 2242/04
USPC .................................................... 379/201.01
See application file for complete search history.

(56) References Cited

U.S. PATENT DOCUMENTS

| | | | | |
|---|---|---|---|---|
| 8,886,113 | B2* | 11/2014 | Palanki | H04B 7/155 455/11.1 |
| 9,078,189 | B2* | 7/2015 | Jang | H04W 36/30 |
| 9,674,649 | B2 | 6/2017 | Vanderveen et al. | |
| 9,749,365 | B2* | 8/2017 | Forsberg | H04L 65/1096 |
| 2012/0147825 | A1* | 6/2012 | Hassan | H04L 12/2818 370/329 |
| 2014/0004796 | A1* | 1/2014 | Cakulev | H04W 76/14 455/41.2 |
| 2014/0357269 | A1* | 12/2014 | Zhou | H04W 8/005 455/434 |
| 2015/0120832 | A1* | 4/2015 | Forsberg | H04L 65/1063 709/204 |
| 2016/0150390 | A1 | 5/2016 | Chen et al. | |
| 2016/0196574 | A1* | 7/2016 | Ganesh | G06Q 30/0246 705/14.45 |
| 2016/0234140 | A1* | 8/2016 | Sirpal | H04L 51/046 |
| 2016/0269614 | A1* | 9/2016 | Rao | H04N 5/23206 |
| 2016/0338122 | A1* | 11/2016 | Tsai | H04W 8/005 |
| 2017/0019861 | A1* | 1/2017 | Rubenstein | H04L 67/1061 |
| 2017/0230918 | A1* | 8/2017 | Ryu | H04W 52/383 |
| 2017/0347339 | A1* | 11/2017 | Yasukawa | H04W 72/04 |
| 2017/0374429 | A1* | 12/2017 | Yang | H04N 21/4882 |
| 2018/0026733 | A1* | 1/2018 | Yang | H04H 20/59 725/33 |
| 2018/0092017 | A1* | 3/2018 | Freda | H04W 76/14 |

FOREIGN PATENT DOCUMENTS

| | | |
|---|---|---|
| KR | 1020150106903 | 9/2015 |
| WO | WO 2016/114864 | 7/2016 |

OTHER PUBLICATIONS

3GPP Universal Mobile Telecommunications System (UMTS); LTE; Functional Architecture and Information Flows to Support Mission Critical Communication Services; Stage 2, (3GPP TS 23.179 Version 13.2.0 Release 13), ETSI TS 123 179 V13.2.0, Jul. 27, 2016.

Korean Office Action dated Feb. 19, 2018 issued in counterpart application No. 10-2017-0094971, 9 pages.

* cited by examiner

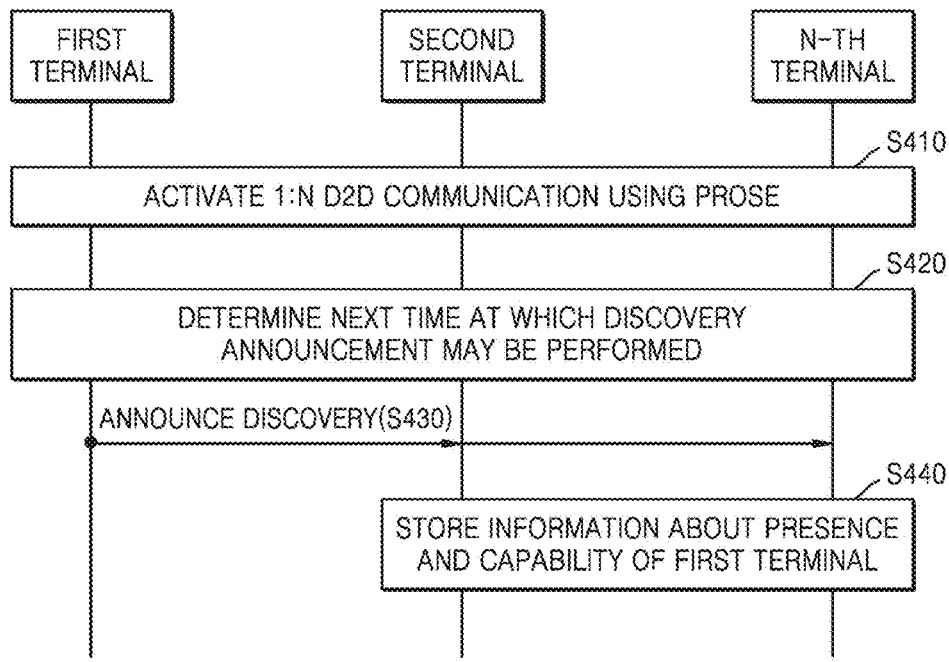
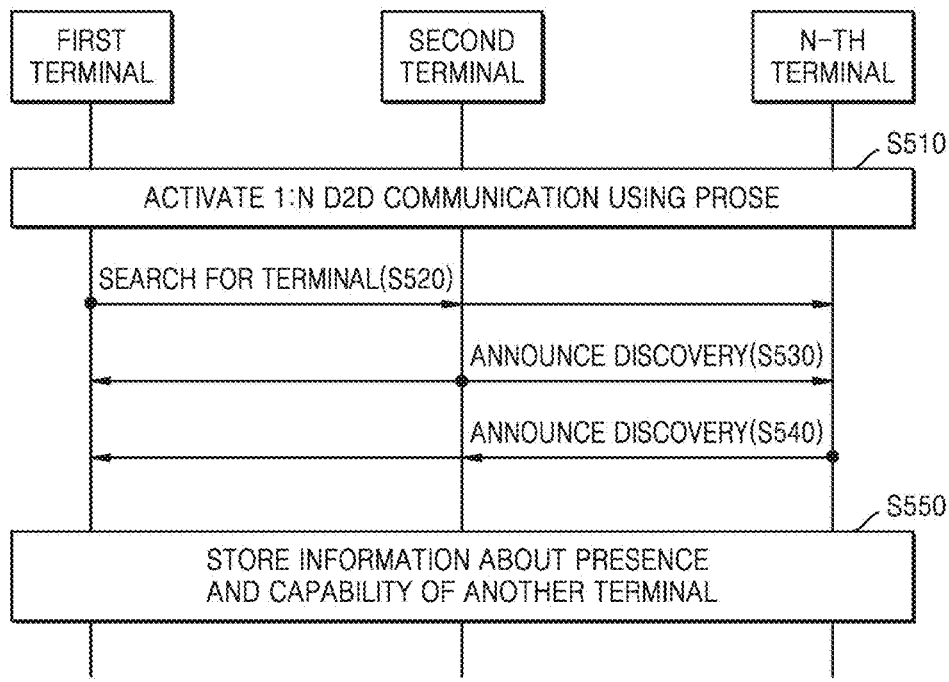

METHOD AND TERMINAL FOR PROVIDING MCPTT SERVICE

PRIORITY

This application claims priority under 35 U.S.C. § 119(e) to U.S. Provisional Patent Application No. 62/402,502, filed in the U.S. Patent and Trademark Office on Sep. 30, 2016, and under 35 U.S.C. § 119(a) to Korean Patent Application No. 10-2017-0094971, filed in the Korean Intellectual Property Office on Jul. 26, 2017, the content of each of which is incorporated herein by reference.

BACKGROUND

1. Field of the Disclosure

The present disclosure generally relates to a method for providing a mission critical push to talk (MCPTT) service, a terminal for providing an MCPTT service, and a non-transitory computer-readable recording medium having a program recorded thereon for executing a method for providing an MCPTT service.

2. Description of the Related Art

In recent years, there has been increased interest in a public safety network for providing communication services in an emergency situation such as a fire, a war, a natural disaster, etc. For example, a special dedicated communication service may be based on a push-to-talk (PTT) service. In a PTT-based communication service, however, only a terminal that has acquired a floor may send talk bursts (e.g., media transmissions).

Further, during an emergency situation, network resources such as a server may not be available, and thus an off-network solution in which there is no central controller is needed. Therefore, for a public safety network, terminal-to-terminal communication may be considered.

Thus, in order to implement an off-network PTT-based communication service, research and development are being conducted for a process of searching for a terminal capable of communication, announcing, setting communication-related parameters, etc.

SUMMARY

The present disclosure is designed to address at least the problems and/or disadvantages described above and to provide at least the advantages described below.

An aspect of the present disclosure is to provide methods and terminals for providing a MCPTT service for announcing information about communication or searching for at least one other terminal capable of communication in order to communicate with the at least one other terminal in an off network situation.

Another aspect of the present disclosure is to provide methods and terminals for providing an MCPTT service for setting parameters for a terminal to establish communication with another terminal or sharing the set parameters. According to an aspect of the present disclosure, a method in which a first terminal provides a MCPTT service includes transmitting, by the first terminal, a first discovery announcement message to plurality of terminals performing device to device (D2D) communication according to the mission critical service, wherein the discovery announcement message includes at least one of a category of the first terminal, video performance of a camera provided in the first terminal, and information about a status of the first terminal; receiving a second discovery announcement message from a second terminal included among the plurality of terminals performing the D2D communication; and acquiring information about a presence and a capability of the second terminal based on the second discovery announcement message.

According to another aspect of the present disclosure, a method in which a first terminal provides a mission critical service includes transmitting a probe message to search for a second terminal capable of communicating with the first terminal, the second terminal being among a plurality of terminals performing device to device (D2D) communication according to the mission critical service; receiving a discovery announcement message from the second terminal capable of communicating with the first terminal in response to the probe message; and acquiring information about a presence and a capability of the second terminal based on the discovery announcement message received in response to the probe message.

According to another aspect of the present disclosure, a first terminal includes a transceiver; and a processor configured to control the transceiver to transmit a first discovery announcement message to a plurality of terminals performing device to device (D2D) communication according to the mission critical service, the discovery announcement message including at least one of a category of the first terminal, video performance of a camera provided in the first terminal, and information about a status of the first terminal, control the transceiver to receive a second discovery announcement message from a second terminal included among the plurality of terminals, and acquire information about a presence and a capability of the second terminal, based on the second discovery announcement message.

BRIEF DESCRIPTION OF THE DRAWINGS

These and/or other aspects, features, and advantages of certain embodiments of the present disclosure will become apparent and more readily appreciated from the following description, taken in conjunction with the accompanying drawings, in which:

FIG. 4 is a flowchart illustrating a method in which a plurality of terminals set a back-off time for transmitting a discovery announcement message, according to an embodiment of the present disclosure;

FIG. 5 is a flowchart illustrating a method in which a plurality of terminals search for another terminal capable of communication, according to an embodiment of the present disclosure;

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness. Although general terms are used for describing the present disclosure in consideration of the functions thereof, these general terms may vary according to intentions of one of ordinary skill in the art, case precedents, the advent of new technologies, etc.

Herein, the terms such as "comprises," "comprising," "includes," and "including" indicate the presence of stated elements, but do not preclude the presence or addition of one or more other elements. The terms "unit" and "module" refer to a unit in which at least one function or operation is performed, and may be implemented as hardware, software, or a combination of hardware and software.

Herein, "and/or" includes any and all combinations of one or more of the associated listed items. Expressions such as "at least one of," when preceding a list of elements, modify the entire list of elements and do not modify the individual elements of the list.

Figure 1:
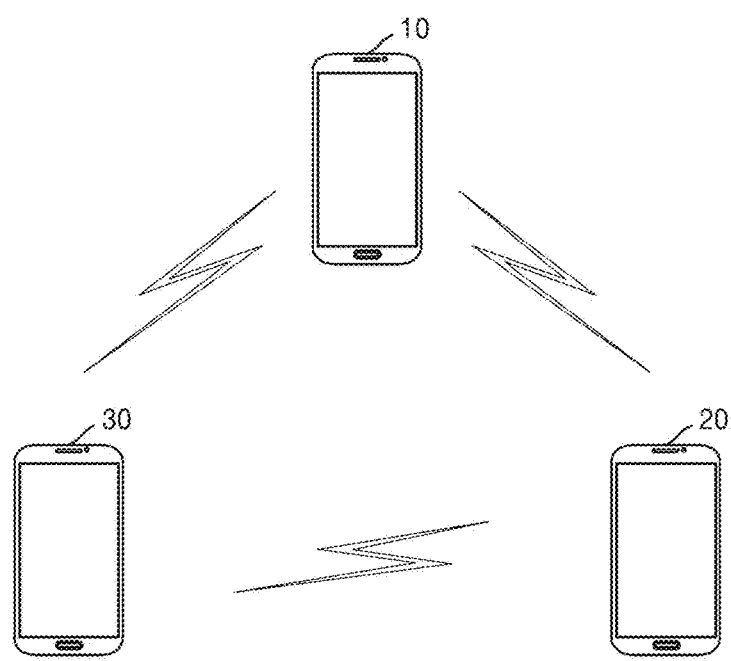
FIG. 1 is a conceptual diagram illustrating a method in which a terminal provides a MCPTT service according to an embodiment of the present disclosure.

FIG. 1 is a conceptual diagram illustrating a method in which a terminal 10 provides a MCPTT service, according to an embodiment of the present disclosure.

Referring to FIG. 1, the terminal 10 may provide the MCPTT service in an LTE-based public safety network, which is called public safety LTE (PS-LTE). The public safety network may provide a protocol for communication to public safety groups, such as police officers and firefighters, in the event of an emergency situation.

Herein, an MCVideo represents a service for mission critical video communication using an LTE transport network. Mission critical may refer to the needs of agencies providing public safety services such as police, fire fighters, ambulance services, etc.

There are various types of networks in which the MCPTT service is provided. For example, in an on-network, a user may talk through support of a network infrastructure such as a server, like using a cellular phone. As another example, in an off-network, a user of the terminal 10 may talk directly to another party without using the network infrastructure. That is, in the off-network, the user of the terminal 10 may talk according to a predetermined rule, without a mediator who controls communication (i.e., approves of a floor), unlike the on-network. Accordingly, the off-network may be used for communication between users in an environment in which no network infrastructure has been established or a special situation in which the support of a network infrastructure may not be available.

For an off-network type MCVideo service, the terminal 10 may determine multimedia parameters and share the determined multimedia parameters with another terminal, before performing group communication. The multimedia parameters may include audio and/or video codecs, a multimedia port, an encryption key, a video resolution, a frame rate, etc., but are not limited to these examples.

The terminal 10 may perform processes such as discovery or probing (i.e., searching) prior to performing communication, to share multimedia parameters and the capability of a terminal with another terminal.

To perform the MCVideo service, the terminal 10 may wait for a discovery announcement message or a group communication announcement message to be received from at least one of the other terminals 20 and 30. The group communication announcement message may include at least one of media parameters such as group identity, group call originator identity, a media type, a media codec, a bandwidth, a multicast port number for media, video resolution, a video frame rate, a port number for a floor control protocol, an encryption key for media encryption, and confirmation mode indication.

The at least one media parameter may be used in an MCVideo group communication. When the group communication announcement message is received, terminal 10 may configure its own parameters according to the received media parameters and join the announced MCVideo group communication.

A message generated by the terminal 10 may be multicast or broadcast such that another terminal 20 or 30 located in a coverage area of the terminal 10 or within a predetermined distance range from the terminal 10 may receive the message. Alternatively, the terminal 10 may unicast the generated message.

Figure 2:
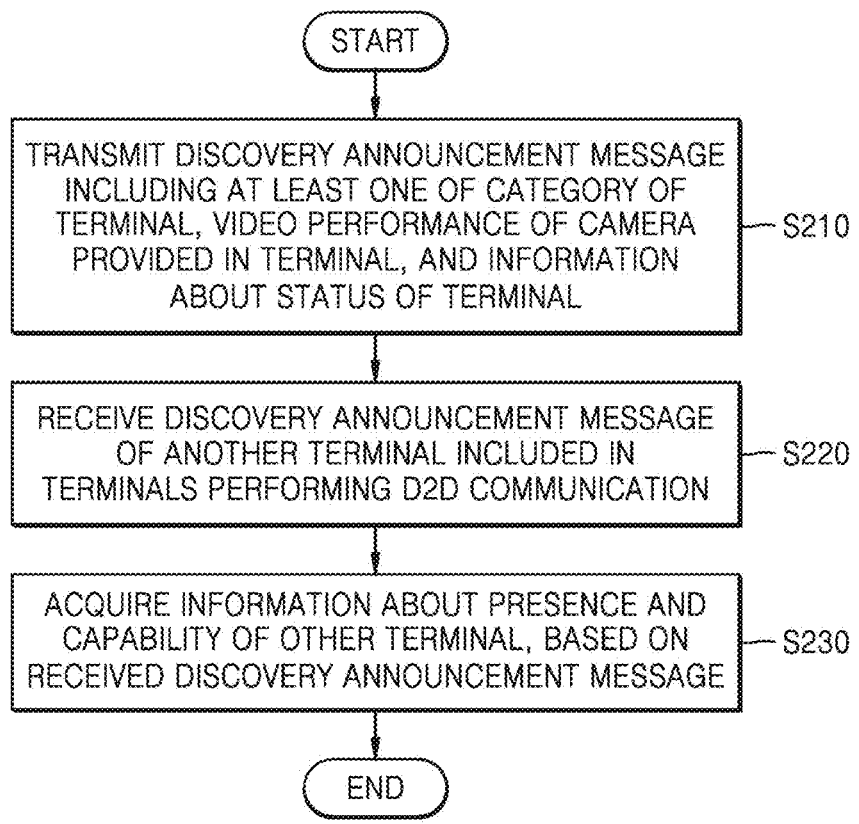
FIG. 2 is a flowchart illustrating a method in which a terminal provides an MCPTT service, according to an embodiment of the present disclosure.

FIG. 2 is a flowchart illustrating a method in which a terminal provides an MCPTT service, according to an embodiment of the present disclosure.

Referring to FIG. 2, in step S210, the terminal transmits a discovery announcement message including at least one of the category of the terminal, the video performance of a camera provided in the terminal, and information about the status of the terminal. The terminal may be any one of terminals performing 1:N D2D communication according to an MCPTT service.

The terminal may periodically transmit a discovery announcement message. The discovery announcement message may include information about the capability of the terminal and other information related to the capability of the terminal. For example, the discovery announcement message may include the category of the terminal, the video performance of a camera, information about the status of the terminal, etc. The category of the terminal may include a drone, a smart phone, a camera, etc., but the category of the terminal is not limited to these examples. The status of the terminal may include a status such as video reception, video transmission, or video recording.

Another terminal that has received the discovery announcement message from the terminal may confirm the presence of the terminal through the discovery announcement message and store the received discovery announcement message. The other terminal may also store information about the capability of the terminal and other information about the capability of the terminal included in the discovery announcement message.

In step S220, the terminal receives a discovery announcement message from another terminal included in the terminals performing D2D communication. A terminal located at a position close to another terminal may receive a discovery announcement message from the other terminal that is periodically broadcast or multicast from the other terminal.

A time point when each of the plurality of terminals performing communication according to the MCPTT service transmits a discovery announcement message may be determined according to a back-off time.

In step S230, the terminal acquires information about the presence and capability of the other terminal based on the received discovery announcement message.

The terminal may check whether another terminal is present by receiving a discovery announcement message from the other terminal. Also, the terminal may store the category of the other terminal, the video performance of a camera, information about the status of the other terminal, etc., included in the discovery announcement message.

Figure 3:
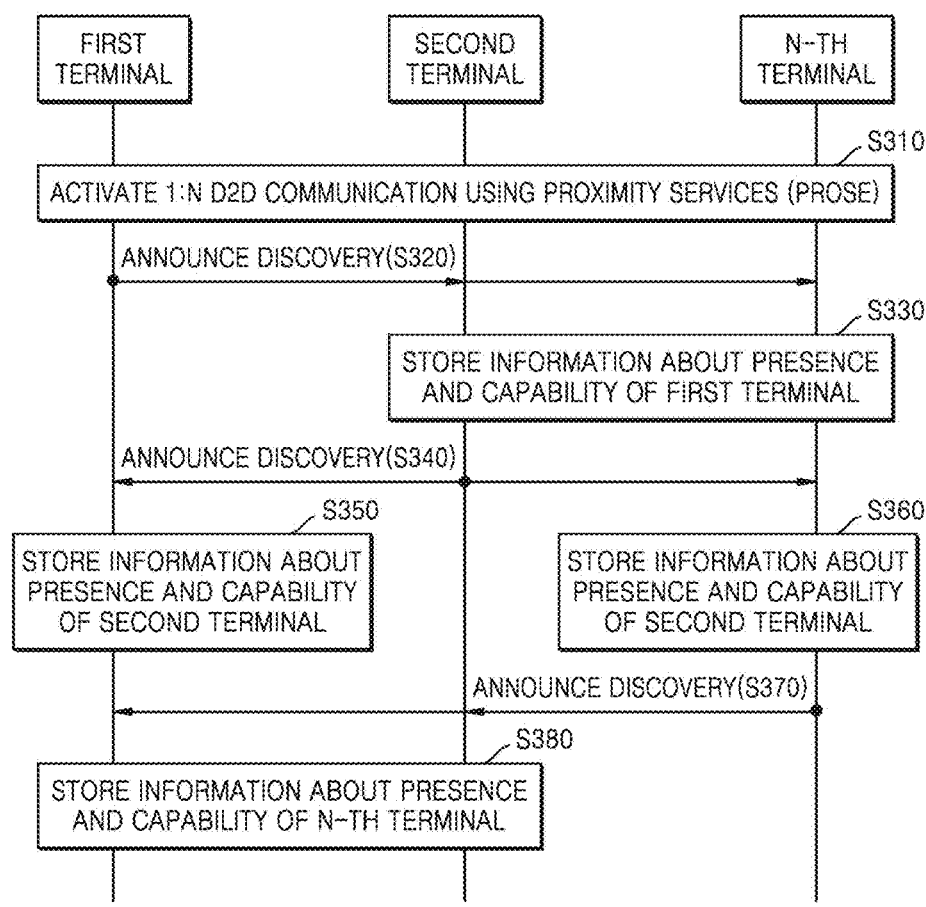
FIG. 3 is a flowchart illustrating a method of periodically transmitting a discovery announcement message between a plurality of terminals, according to an embodiment of the present disclosure.

FIG. 3 is a flowchart illustrating a method of periodically transmitting a discovery announcement message between a plurality of terminals, according to an embodiment of the present disclosure.

Referring to FIG. 3, in step S310, a first terminal, a second terminal, and an N-th terminal may activate 1:N D2D communication using proximity services (ProSe). For example, the first terminal, the second terminal, and the N-th terminal may set a channel for 1:2 D2D communication using ProSe. Here, it is assumed that the first to N-th terminals are included in the same ProSe group.

In step S320, the first terminal transmits a discovery announcement message. The discovery announcement message transmitted from the first terminal may be received at the second terminal and the N-th terminal. The discovery announcement message may include information about the capability of the first terminal and other information related to the first terminal. For example, the discovery announcement message may include information about specific category tags (e.g., certain video camera), the video performance of a camera, the status of the first terminal, etc. The status of the first terminal may include video transmission, video recording, video reception, etc. In step S330, the second terminal and the N-th terminal store information about the presence and capability of the first terminal. The second terminal and the N-th terminal may each confirm the presence of the first terminal as the discovery announcement message is received. Also, the second terminal and the N-th terminal may each acquire capability information included in the discovery announcement message and may store the acquired capability information.

In step S340, the second terminal transmits a discovery announcement message. The discovery announcement message transmitted from the second terminal may be received at the first terminal and the N-th terminal. In this case, the discovery announcement message may include information about the capability of the second terminal and other information related to the information about the capability of the second terminal.

In step S350, the first terminal stores information about the presence and capability of the second terminal.

In step S360, the N-th terminal stores the information about the presence and capability of the second terminal.

Although step S350 and step S360 are described as being sequentially performed, step S360 may be performed before step S350, or steps S350 and S360 may be simultaneously performed.

In step S370, the N-th terminal transmits a discovery announcement message. The discovery announcement message transmitted from the N-th terminal may be received at the first terminal and the second terminal. The discovery announcement message may include information about the capability of the N-th terminal and other information related to the information about the capability of the N-th terminal.

In step S380, the first terminal and the second terminal stores information about the presence and capability of the N-th terminal.

Steps S320, S340, and S370 may be periodically performed, and correspondingly, steps S330, S350, and S380 may be periodically performed.

FIG. 4 is a flowchart illustrating a method in which a plurality of terminals set a back-off time for transmitting a discovery announcement message, according to an embodiment of the present disclosure.

Specifically, the plurality of terminals may set a back-off time for transmission of a discovery announcement message to avoid collisions. Each of the plurality of terminals may broadcast a discovery announcement message after the back-off time, depending on the setting.

Referring to FIG. 4, in step S410, a first terminal, a second terminal, and an N-th terminal activate 1:N D2D communication using ProSe.

In step S420, the first terminal, the second terminal, and the N-th terminal determine the next time a discovery announcement may be performed. For example, the first terminal, the second terminal, and the N-th terminal may each determine the next time a discovery announcement may be performed, based on at least one of a preconfigured value and the frequency at which a discovery announcement message has been previously received.

In step S430, the first terminal transmits a discovery announcement message. The first terminal may transmit a discovery announcement message, which includes information about the capability of the first terminal and other information related to the information about the capability of the first terminal, after waiting for the determined back-off time.

In step S440, the second terminal and the N-th terminal store information about the presence and capability of the first terminal. The second terminal and the N-th terminal according to an embodiment of the present disclosure may each confirm the presence of the first terminal as the discovery announcement message is received. Also, the second terminal and the N-th terminal may each acquire capability information included in the discovery announcement message and may store the acquired capability information.

When received information about the capability of the first terminal is different from previously stored information, the second terminal and the N-th terminal may update information about the first terminal with newly received information about the capability of the first terminal.

FIG. 5 is a flowchart illustrating a method in which a plurality of terminals search for another terminal capable of communication, according to an embodiment of the present disclosure.

Referring to FIG. 5, in step S510, a first terminal, a second terminal, and an N-th terminal activate 1:N D2D communication using ProSe.

In step S520, the first terminal searches for a terminal capable of communication. For example, the first terminal may broadcast a probe message to search for another terminal capable of communication located in an area close to the first terminal. The probe message may include at least one of a user identifier (ID) of the first terminal, a terminal ID of the first terminal, capability information, and a category.

In step S530, upon receiving the probe message, the second terminal transmits a discovery announcement message including information about the capability of the second terminal and other information related to the second terminal.

In step S540, upon receiving the probe message, the N-th terminal may transmit a discovery announcement message including information about the capability of the N-th terminal and other information related to the information about the capability of the N-th terminal.

In step S550, the first terminal, the second terminal, and the N-th terminal may each store information about the presence and capability of a terminal transmitting a discovery announcement message, based on a received discovery announcement message from another terminal. For example, the first terminal may store information about the presence and capability of the N-th terminal, based on a discovery announcement message of the N-th terminal received from the N-th terminal.

Figure 6:
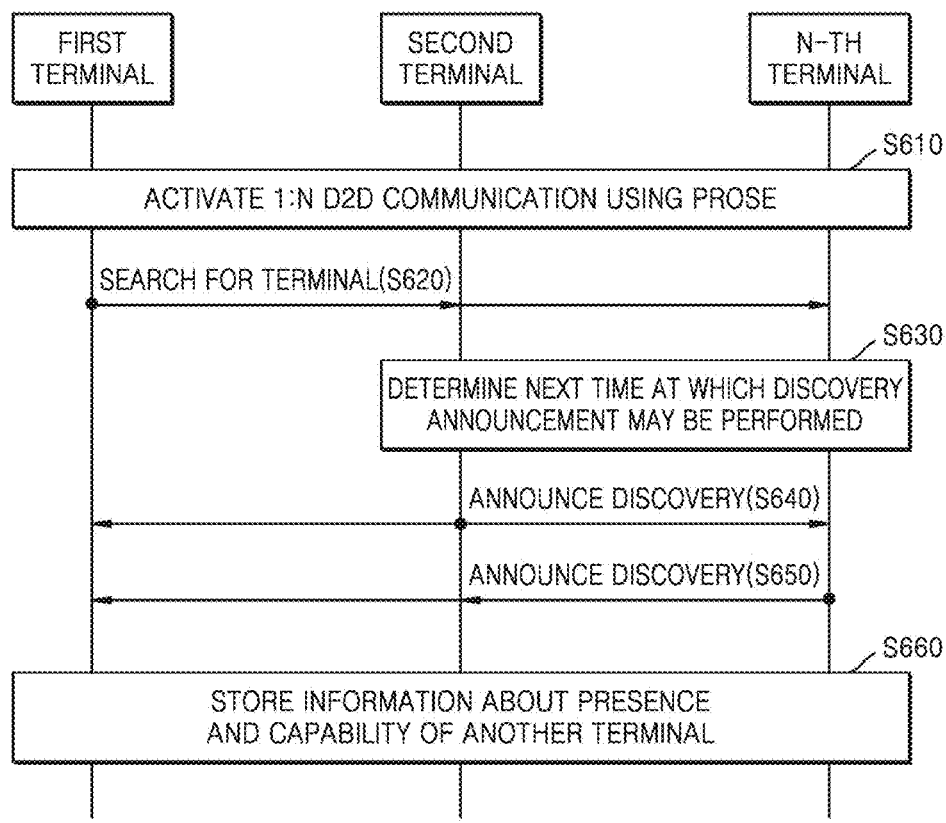
FIG. 6 is a flowchart illustrating a method in which a terminal determines a back-off time for transmitting a discovery announcement message when receiving a probe message, according to an embodiment of the present disclosure.

FIG. 6 is a flowchart illustrating a method in which a terminal determines a back-off time for transmitting a discovery announcement message when receiving a probe message, according to an embodiment of the present disclosure.

Referring to FIG. 6, in step S610, a first terminal, a second terminal, and an N-th terminal activate 1:N D2D communication using ProSe.

In step S620, the first terminal searches for a terminal capable of communication. For example, the first terminal may broadcast a probe message to search for another terminal capable of communication, located in an area close to the first terminal. The probe message may include at least one of a user ID of the first terminal, a terminal ID of the first terminal, capability information, and a category.

In step S630, the second terminal and the N-th terminal determine the next time a discovery announcement may be performed. For example, the first terminal, the second terminal, and the N-th terminal may each determine the next time a discovery announcement may be performed, based on at least one of a preconfigured value and the frequency at which a discovery announcement message has been previously received.

In step S640, the second terminal transmits a discovery announcement message. The second terminal according to an embodiment of the present disclosure may transmit a discovery announcement message to at least one of the first terminal and the N-th terminal after waiting for the determined back-off time.

In step S650, the N-th terminal transmits a discovery announcement message. The N-th terminal may transmit a discovery announcement message to at least one of the first terminal and the second terminal after waiting for the determined back-off time.

In step S660, the first terminal, the second terminal, and the N-th terminal each store information about the presence and capability of another terminal. As a discovery announcement message is received, the first terminal, the second terminal, and the N-th terminal may each confirm the presence of a terminal that has transmitted the discovery announcement message. Also, the first terminal, the second terminal, and the N-th terminal may each acquire capability information included in the discovery announcement message and may store the acquired capability information. When the received information about the capability of the other terminal is different from previously stored information, the first terminal, the second terminal, and the N-th terminal may each update information about the other terminal with newly received information about the capability of the other terminal.

Figure 7:
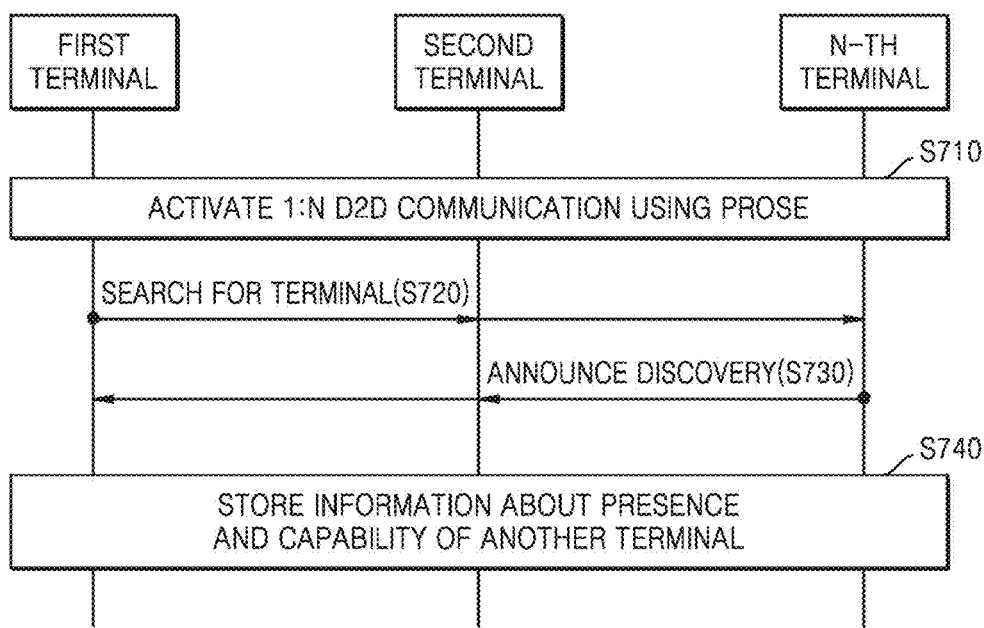
FIG. 7 is a flowchart illustrating a method in which a terminal broadcasts a probe message and searches for a certain terminal, according to an embodiment of the present disclosure.

FIG. 7 is a flowchart illustrating a method in which a terminal broadcasts a probe message and searches for a certain terminal, according to an embodiment of the present disclosure.

Referring to FIG. 7, in step S710, a first terminal, a second terminal, and an N-th terminal activate 1:N D2D communication using ProSe.

In step S720, the first terminal searches for a terminal capable of communication. For example, the first terminal may broadcast a probe message to search for another terminal capable of communication that is located in an area close to the first terminal. The probe message may include at least one of a user ID of the first terminal, a terminal ID of the first terminal, capability information, and a category.

In step S730, the N-th terminal transmits a discovery announcement message. The N-th terminal may transmit a discovery announcement message including information about the capability of the N-th terminal and other information related to the information about the capability of the N-th terminal.

In step S740, the first terminal, the second terminal, and the N-th terminal each store information about the presence and capability of another terminal and other information related to the information about the other terminal. For example, the first terminal may confirm the presence of the N-th terminal through a discovery announcement message received from the N-th terminal. In addition, the first terminal may store information about the capability of N-th terminal and other information related to the information about the capability of the N-th terminal.

Figure 8:
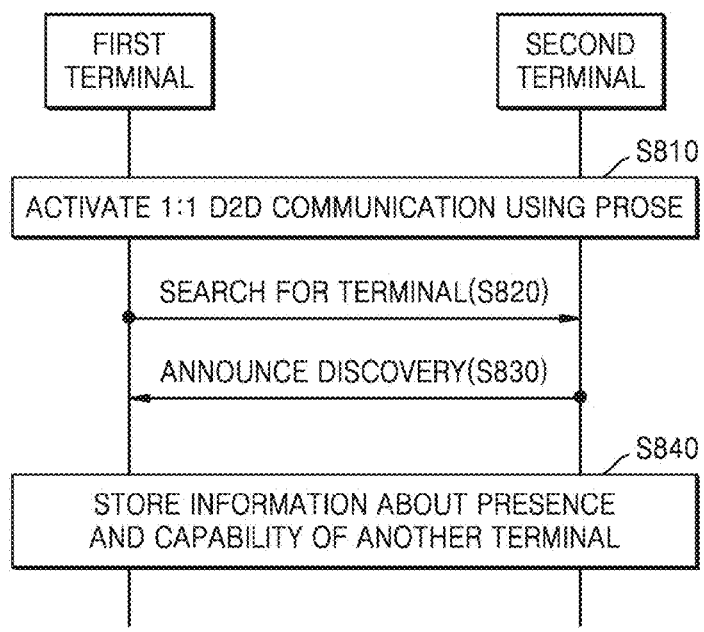
FIG. 8 is a flowchart illustrating a method in which a terminal unicasts a probe message and searches for a certain terminal, according to an embodiment of the present disclosure.

FIG. 8 is a flowchart illustrating a method in which a terminal unicasts a probe message and searches for a certain terminal, according to an embodiment of the present disclosure.

Referring to FIG. 8, in step S810, a first terminal and a second terminal activate 1:1 D2D communication using ProSe.

In step S820, the first terminal searches for a terminal capable of communication. For example, the first terminal may unicast a probe message to search for a certain terminal capable of communication that is located in an area close to the first terminal. The probe message may include at least one of a user ID of the first terminal, a terminal ID of the first terminal, capacity information, and a category.

In step S830, the second terminal transmits a discovery announcement message. The second terminal according to an embodiment of the present disclosure may transmit a discovery announcement message including information about the capability of the second terminal and other information related to the second terminal.

In step S840, the first terminal and the second terminal each store information about the presence and capability of another terminal and other information related to the other terminal. For example, the first terminal may store information about the presence and capability of the second terminal and other information related to the capability of the second terminal, received from the second terminal through a discovery announcement message. In addition, the second terminal may confirm the presence of the first terminal through a probe message received from the first terminal, and may store at least one of a user ID of the first terminal, a terminal ID of the first terminal, capacity information, and a category, included in the probe message.

Figure 9:
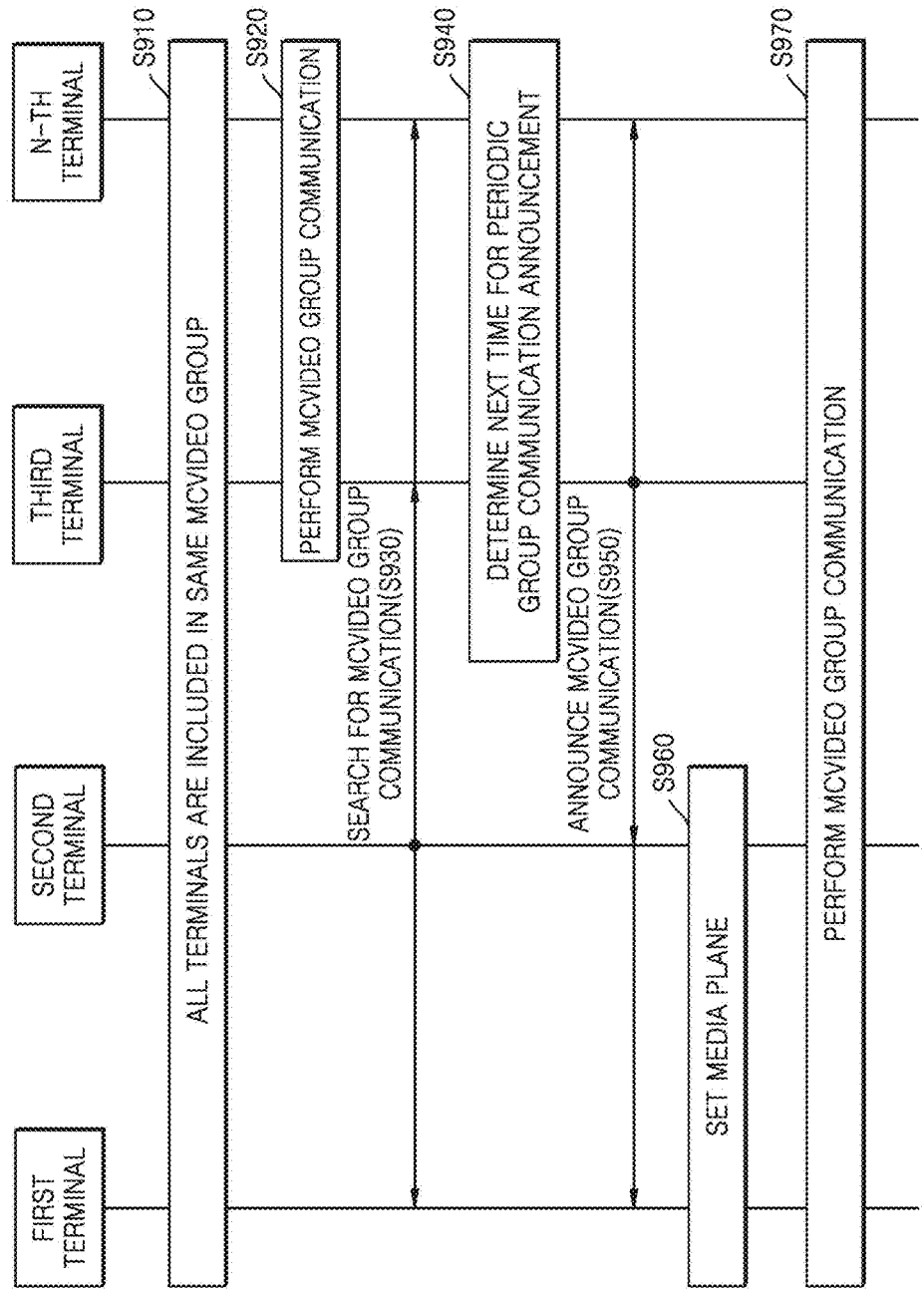
FIG. 9 is a flowchart illustrating a method in which a terminal searches for another terminal during group communication, according to an embodiment of the present disclosure.

FIG. 9 is a flowchart illustrating a method in which a terminal searches for another terminal during group communication, according to an embodiment of the present disclosure.

In FIG. 9, it is assumed that a third terminal and an N-th terminal are terminals participating in an MCVideo group communication in progress.

Referring to FIG. 9, in step S910, a first terminal, a second terminal, a third terminal, and an N-th terminal are included in the same MCVideo group.

In step S920, the third terminal and the N-th terminal perform an MCVideo group communication.

In step S930, the second terminal searches for an MCVideo group communication. For example, the second terminal may broadcast a probe MCVideo group communication message to search for whether there are terminals performing an MCVideo group communication among terminals included in the MCVideo group.

In step S940, the third terminal and the N-th terminal determine the next time a periodic group communication announcement may be performed. For example, the third terminal and the N-th terminal may each determine the next time a discovery announcement may be performed, based on at least one of a preconfigured value and the frequency at which an MCVideo group communication announcement message has been previously received.

In step S950, the third terminal may announce an MCVideo group communication.

In step S950, the third terminal transmits an MCVideo group communication announcement message after a determined back-off time has elapsed. The MCVideo group communication announcement message may include a session description protocol (SDP) body. Another terminal (e.g., the N-th terminal) that has determined the back-off time may drop its MCVideo group communication announcement message as the MCVideo group communication announcement message of the third terminal is received. Accordingly, an MCVideo group communication announcement message from the N-th terminal may not be broadcasted.

In step S960, the first terminal and the second terminal set a media plane. As the MCVideo group communication message from the third terminal is received, the first and second terminals that do not participate in the MCVideo group communication in progress may each set a media plane according to information included in the MCVideo group communication message.

The media plane is a transmission and/or reception channel for data such as voice and video, and may control the flow of media.

In step S970, the first terminal to the N-th terminal perform the MCVideo group communication. As the media plane is set according to the information included in the MCVideo group communication announcement message received from the third terminal, the first terminal and the second terminal may participate in the MCVideo group communication in progress.

Figure 10:
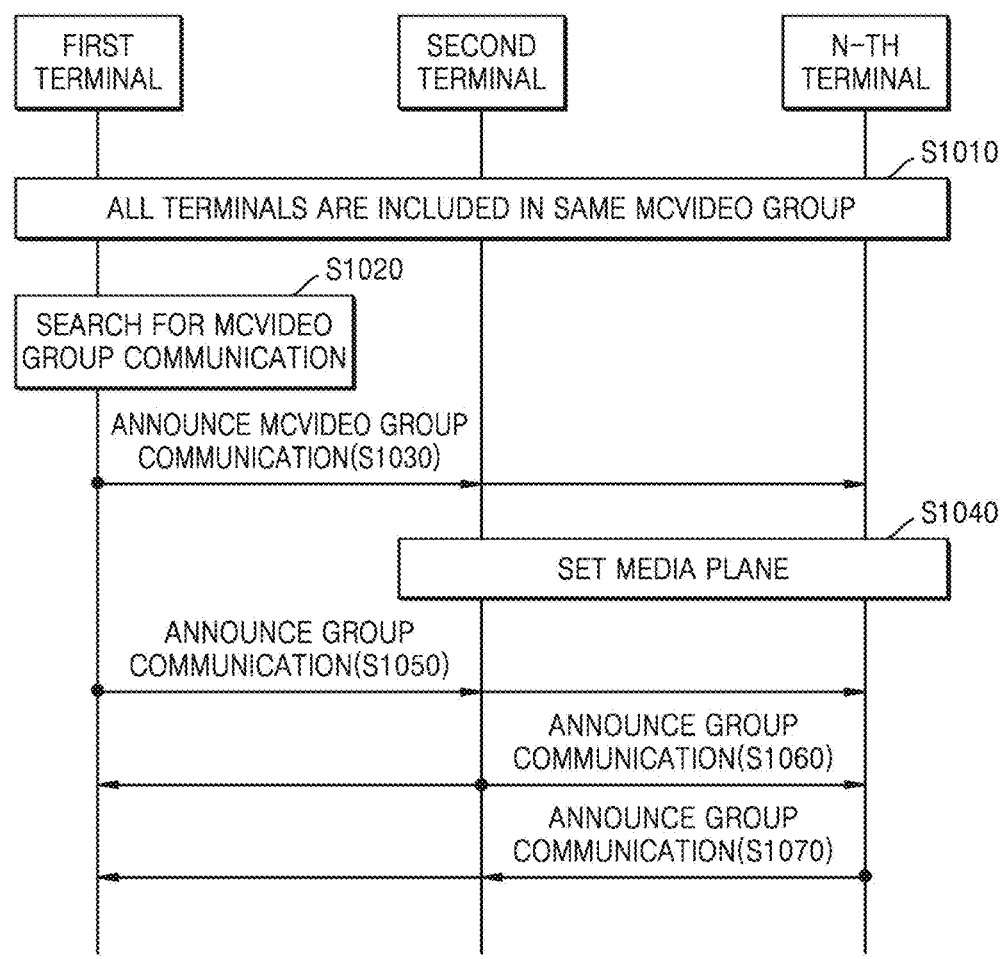
FIG. 10 is a flowchart illustrating a method in which a terminal sets group communication, according to an embodiment of the present disclosure.

FIG. 10 is a flowchart illustrating a method in which a terminal sets group communication, according to an embodiment of the present disclosure.

Referring to FIG. 10, in step S1010, a first terminal, a second terminal, and an N-th terminal are included in the same MCVideo group.

In step S1020, the first terminal searches for an MCVideo group communication in progress. As the first terminal receives a user's request for the establishment of the MCVideo group communication, the first terminal may initiate a search for the MCVideo group communication in progress in the requested MCVideo group.

In step S1030, the first terminal announces MCVideo group communication. The first terminal may broadcast an MCVideo group communication announcement message to other terminals in the MCVideo group if it is determined that there is no close range MCVideo group communication in progress. In this case, the MCVideo group communication announcement message may include an SDP body.

In step S1040, as the MCVideo group communication announcement message is received, all idle MCVideo terminals each set a media plane according to information included in the MCVideo group communication announcement message.

In step S1050, the first terminal announces group communication. The first terminal may periodically broadcast an MCVideo group communication announcement message to the MCVideo group as the MCVideo group communication is established that is based on the media plane. In this case, the MCVideo group communication announcement message may include an SDP body.

In step S1060, the second terminal announces group communication. The second terminal may periodically broadcast an MCVideo group communication announcement message to the MCVideo group as the MCVideo group communication is established based on the media plane. In this case, the MCVideo group communication announcement message may include an SDP body.

In step S1070, the N-th terminal announces group communication. The N-th terminal may periodically broadcast an MCVideo group communication announcement message to the MCVideo group as the MCVideo group communication is established based on the media plane. In this case, the MCVideo group communication announcement message may include an SDP body.

Steps S1050, S1060, and S1070 may be periodically performed. Furthermore, the group communication announcement message may include at least one of information about a user ID, information about a group ID, information about a media type codec, information about a control port for video transmission, information about video resolution, information about a video frame rate, information about a video mode, and information about a time when the video mode was last changed. The video mode represents the level of urgency of a situation and may include an urgent real time mode, a non-urgent real time mode, and a non-real time mode. The latency of a video stream may be controlled according to the video mode.

Figure 11:
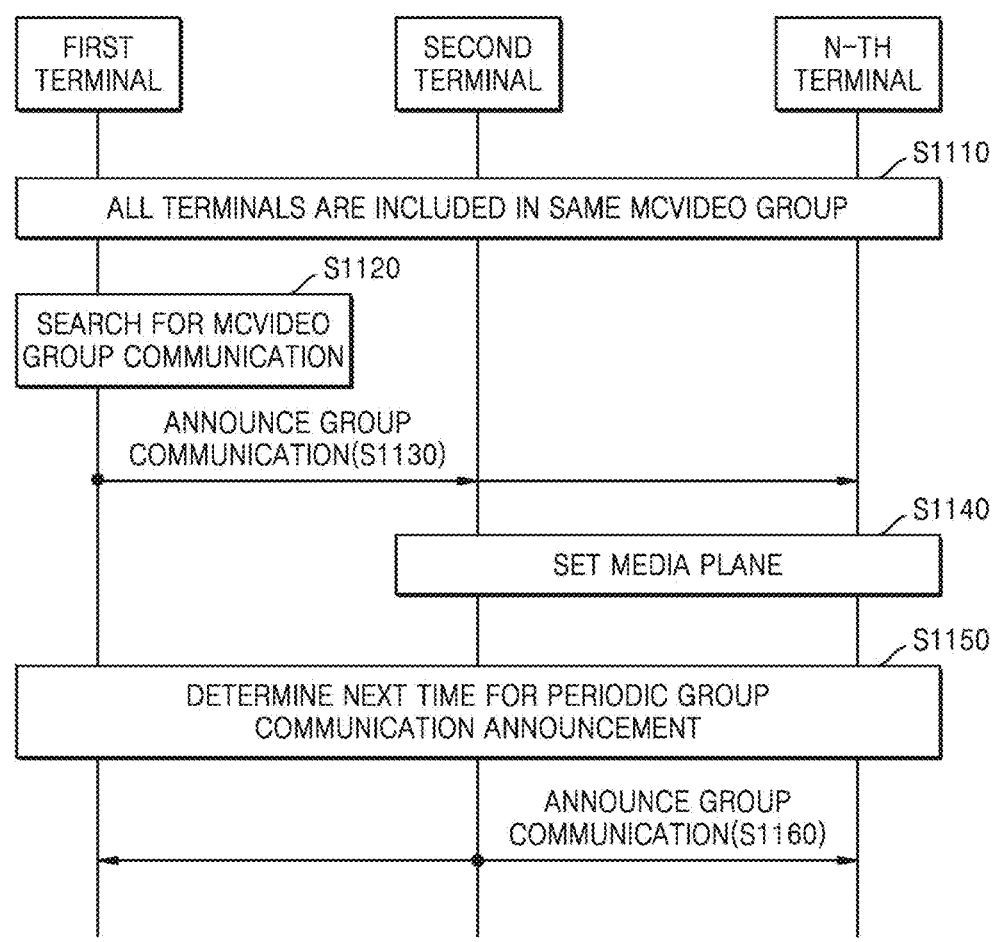
FIG. 11 is a flowchart illustrating a method in which a terminal sets a back-off time during group communication, according to an embodiment of the present disclosure.

FIG. 11 is a flowchart illustrating a method in which a terminal sets a back-off time during group communication, according to an embodiment of the present disclosure.

Referring to FIG. 11, in step S1110, a first terminal, a second terminal, and an N-th terminal are included in the same MCVideo group.

In step S1120, the first terminal searches for MCVideo group communication in progress. As the first terminal receives a request for the establishment of the MCVideo group communication, the first terminal may initiate a search for the MCVideo group communication in progress in a requested MCVideo group.

In step S1130, the first terminal announces group communication. The first terminal may broadcast an MCVideo group communication announcement message to other terminals in the MCVideo group if it is determined that there is no MCVideo group communication in progress in a close range with respect to the requested MCVideo group. In this case, the MCVideo group communication announcement message may include an SDP body.

In step S1140, as the MCVideo group communication announcement message is received, all idle MCVideo terminals each set a media plane according to information included in the MCVideo group communication announcement message. In this case, the idle MCVideo terminals may denote terminals that do not set a media plane for group communication.

In step S1150, the first terminal, the second terminal, and the N-th terminal determine the next time a periodic group communication announcement may be performed. The first terminal, the second terminal, and the N-th terminal may determine the next time group communication may be announced as the MCVideo group communication is established that is based on the media plane.

For example, the first terminal, the second terminal, and the N-th terminal may each determine the next time group communication may be announced, based on at least one of a preconfigured value and the frequency at which an MCVideo group communication announcement message has been received.

In step S1160, the second terminal announces group communication. The second terminal may transmit an MCVideo group communication announcement message after a determined back-off time. In this case, the MCVideo group communication announcement message may include an SDP body.

Another terminal receiving the MCVideo group communication announcement message may re-determine the back-off time.

Figure 12:
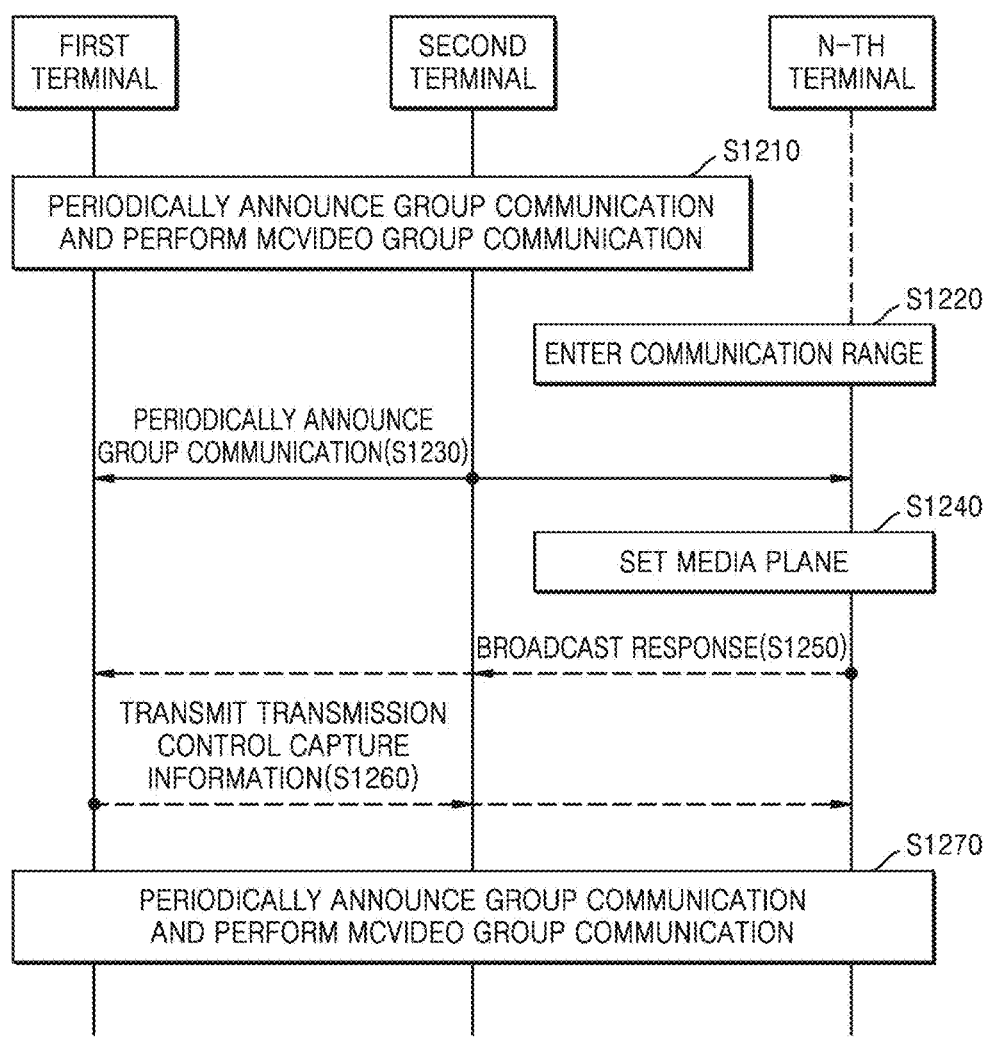
FIG. 12 is a flowchart illustrating a method in which a terminal manually participates in a mission critical video (MCVideo) group communication, according to an embodiment of the present disclosure.

FIG. 12 is a flowchart illustrating a method in which a terminal manually participates in MCVideo group communication, according to an embodiment of the present disclosure.

Referring to FIG. 12, in step S1210, a first terminal and a second terminal perform MCVideo group communication. The first terminal and the second terminal may also periodically announce group communication.

In step S1220, an N-th terminal enters a communication range. In this case, it is assumed that the N-th terminal enters the communication range after the MCVideo group communication is established. The N-th terminal may wait for a group communication announcement message to be transmitted from another terminal participating in the MCVideo group communication.

In step S1230, the second terminal announces group communication. The second terminal participating in the MCVideo group communication may broadcast an MCVideo group communication announcement message. Alternatively, the first terminal, which is another terminal participating in the MCVideo group communication, may broadcast the MCVideo group communication announcement message. In this case, the MCVideo group communication announcement message may include an SDP body.

In step S1240, the N-th terminal sets a media plane. As the MCVideo group communication announcement message is received, the N-th terminal may set the media plane according to information included in the MCVideo group communication announcement message.

In step S1250, the N-th terminal broadcasts a response to inform other terminals in the MCVideo group communication about the participation of the N-th terminal.

In step S1260, the first terminal transmits transmission control capture information to the N-th terminal. In this case, the transmission control capture information may include information about a terminal having transmission control authority.

In step S1270, the first terminal, the second terminal, and the N-th terminal perform the MCVideo group communication.

Figure 13:
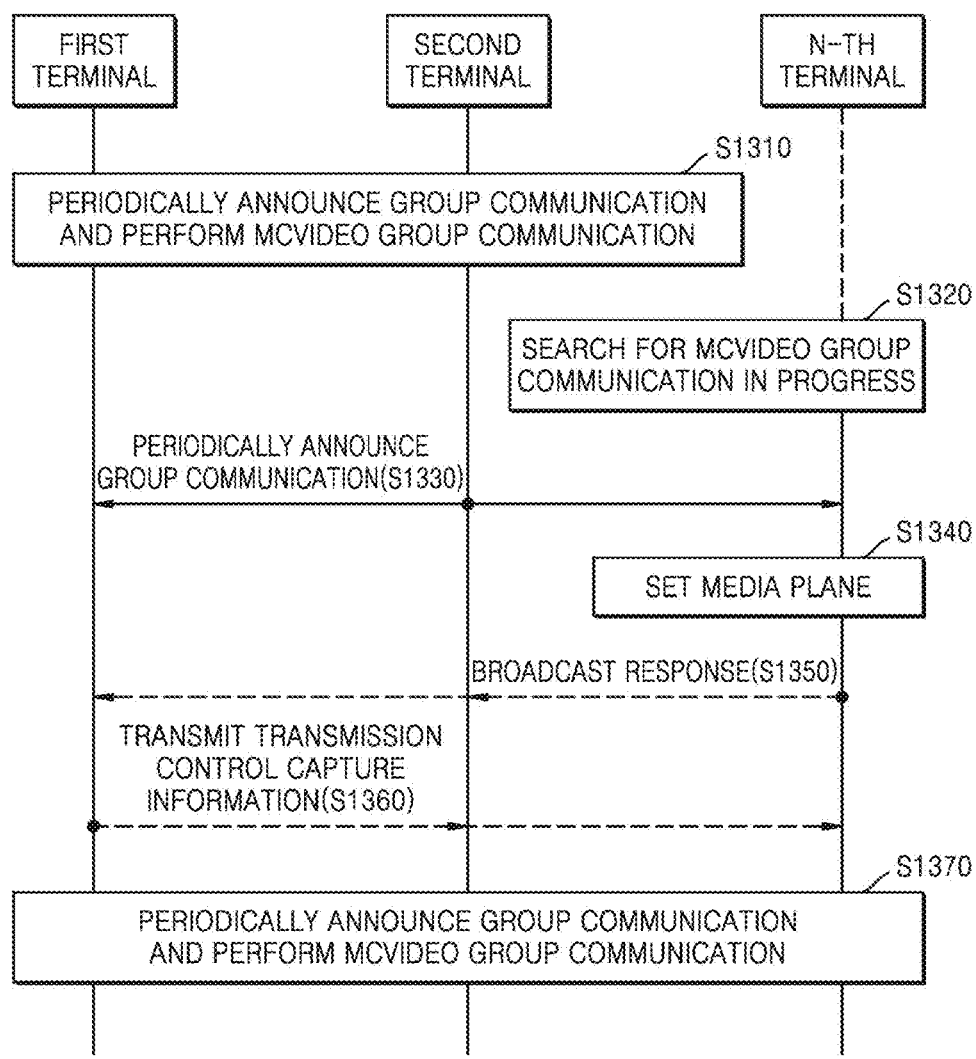
FIG. 13 is a flowchart illustrating a method in which a terminal actively participates in an MCVideo group communication, according to an embodiment of the present disclosure.

FIG. 13 is a flowchart illustrating a method in which a terminal actively participates in MCVideo group communication, according to an embodiment of the present disclosure.

Referring to FIG. 13, in step S1310, a first terminal and a second terminal perform MCVideo group communication. The first terminal and a second terminal may also periodically announce group communication.

In step S1320, an N-th terminal searches for an MCVideo group communication in progress. After the MCVideo group communication is established, the N-th terminal entering a communication range may broadcast an MCVideo group communication probe message to search for the MCVideo group communication.

In step S1330, the second terminal announces a group communication. The second terminal participating in the MCVideo group communication may broadcast an MCVideo group communication announcement message. However, this is only an example, and the first terminal, which is another terminal participating in the MCVideo group communication, may broadcast the MCVideo group communication announcement message. In this case, the MCVideo group communication announcement message may include an SDP body.

In step S1340, the N-th terminal sets a media plane. As the MCVideo group communication announcement message is received, the N-th terminal may set a media plane according to information included in the MCVideo group communication announcement message.

In step S1350, the N-th terminal broadcasts a response to inform another terminal in the MCVideo group communication of the participation of the N-th terminal.

In step S1360, the first terminal transmits transmission control capture information to the N-th terminal. In this case, the transmission control capture information may include information about a terminal having transmission control authority.

In step S1370, the first terminal, the second terminal, and the N-th terminal perform the MCVideo group communication. The first terminal, the second terminal, and the N-th terminal may also periodically announce group communication.

Figure 14:
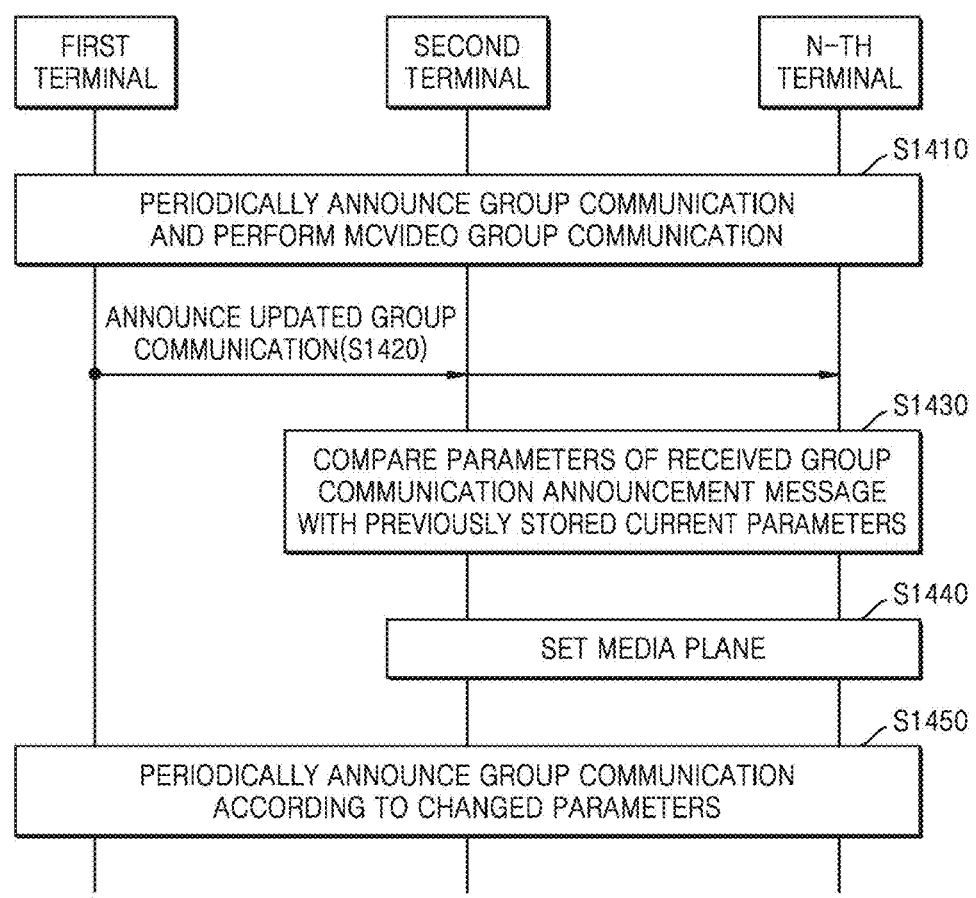
FIG. 14 is a flowchart illustrating a method in which a terminal updates an MCVideo group communication, according to an embodiment of the present disclosure.

FIG. 14 is a flowchart illustrating a method in which a terminal updates MCVideo group communication, according to an embodiment of the present disclosure.

Referring to FIG. 14, in step S1410, a first terminal, a second terminal, and an N-th terminal perform MCVideo group communication. A first terminal, a second terminal, and an N-th terminal may also periodically announce group communication.

In step S1420, the first terminal announces updated group communication. The first terminal may broadcast an MCVideo group communication announcement message including information about the updated group communication. In this case, updated MCVideo group communication announcement message may include an updated SDP body.

In step S1430, the second terminal and the N-th terminal compare parameters of a received MCVideo group communication announcement message with previously stored parameters from previous MCVideo group communications.

In step S1440, the second terminal and the N-th terminal set a media plane according to the updated MCVideo group communication announcement message. For example, the second terminal and the N-th terminal may update the media plane according to parameters included in the updated MCVideo group communication announcement message.

The second terminal and the N-th terminal may determine whether to update the media plane based on the priority of a call, a call type, and a parameter change time when the parameters included in the updated MCVideo group communication announcement message are different from the previously stored parameters. The priority of the call may be determined based on urgency, and may include emergency, basics, imminent peril, etc. The call type may be determined according to whether the data to be transmitted is voice, whether the data is video, or whether the data is a combination of voice and video.

In step S1450, the first terminal, the second terminal, and the N-th terminal periodically announce group communication according to changed parameters. For example, the first terminal, the second terminal, and the N-th terminal may periodically transmit an MCVideo group communication announcement message including updated parameters, according to the update.

Figure 15:
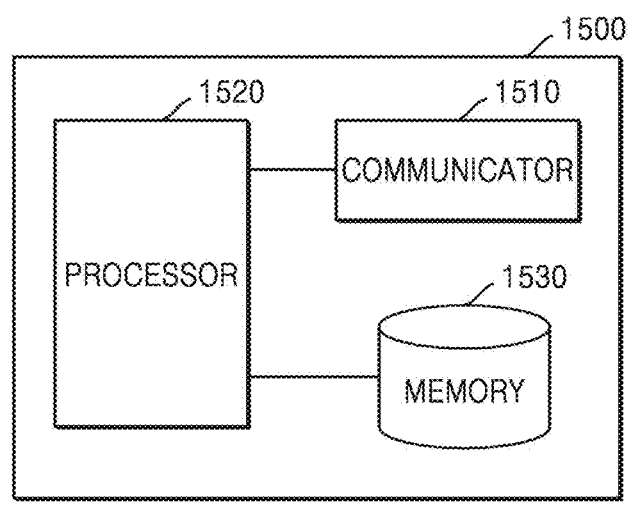
FIG. 15 is a block diagram of a terminal according to an embodiment of the present disclosure.

FIG. 15 is a block diagram of a terminal 1500 according to an embodiment of the present disclosure.

Referring to FIG. 15, the terminal 1500 includes a communicator 1510, a processor 1520, and a memory 1530.

The communicator 1510 is connected to the processor 1520 and transmits and/or receives a message according to an MCPTT service. For example, the communicator 1510 may transmit and/or receive a discovery announcement message, a probe message, and an MCVideo group communication announcement message under the control of the processor 1520.

The processor 1520 implements proposed functions, procedures, and/or methods. The operation of the terminal 1500 may be implemented by processor 1520. The processor 1520 may perform various processes, such as discovery announcement, probe, group call probe, group call announcement, media plane configuration, and media plane update in the MCPTT service, as described above with reference to FIGS. 1 to 14.

The processor 1520 may control the communicator 1510 to transmit a discovery announcement message and receive a discovery announcement message from another terminal included in terminals performing D2D communication. Also, the processor 1520 may acquire information about the presence and capability of another terminal, based on a received discovery announcement message.

The processor 1520 may store a back-off time for transmission of the discovery announcement message, based on a preconfigured value and the reception frequency of a discovery announcement message from another terminal received before the transmission of the discovery announcement message. In addition, the processor 1520 may control the communicator 1510 to transmit a discovery announcement message after the determined back-off time.

The processor 1520 may control the communicator 1510 to broadcast a probe message to search for another terminal capable of communicating with a terminal and to receive a discovery announcement message from the other terminal, which is capable of communicating with the terminal, in response to a probe message. The processor 1520 may acquire information about the presence and capability of the other terminal based on the discovery announcement message received in response to the probe message.

The processor 1520 may control the communicator 1510 to unicast a probe message to another terminal capable of communicating with a terminal and to receive a discovery announcement message of the other terminal capable of communicating with the terminal in response to the probe message. In addition, the processor 1520 may acquire information about the presence and capability of the other terminal based on the discovery announcement message received in response to the probe message.

The processor 1520 may control the communicator 1510 to transmit a group communication probe message to confirm whether group communication from at least some terminals included in the same group as the terminal is performed. In addition, the processor 1520 may set a media plane based on a group communication announcement message received in response to the group communication probe message, and may perform group communication with at least some terminals according to the set media plane.

The processor 1520 may control the communicator 1510 to transmit a group communication announcement message from a terminal when there is no group communication in progress. In addition, when a media plane is set according to the group communication announcement message transmitted to another terminal that has received the group communication announcement message, the processor 1520 may control the communicator 1510 to receive a group communication announcement message from the other terminal that has set the media plane.

The processor 1520 may control the communicator 1510 to transmit a group communication announcement message including updated information when information of the terminal is updated.

The processor 1520 may include an application specific integrated circuit (ASIC), logic circuits, data processors, and/or other chipsets.

The memory 1530 is connected to the processor 1520, and stores protocols and parameters for operation. The memory 1530 may store at least one instruction that may direct the processor 1520 to perform the processes described above with reference to FIGS. 1 to 14.

The memory 1530 may include a read-only memory (ROM), a random access memory (RAM), a flash memory, a memory card, a storage medium, and/or other storage devices. When the above-described embodiment is implemented in software, the above-described scheme may be implemented using a module (e.g., a process or a function) that performs the above functions. The module may be stored in the memory 1530 and executed by the processor 1520. The memory 1530 may be disposed inside or outside the processor 1520, and may be connected to the processor 1520 by using a variety of well-known means.

In the above example systems, although the methods have been described on the basis of the flowcharts using a series of steps or blocks, the present disclosure is not limited to the sequence of the steps, and some of the steps may be performed at different sequences from the other steps or may be performed simultaneously with the other steps. Further, those of ordinary skill in the art should understand that the steps shown in the flowcharts are not exclusive and may include other steps, or that one or more of the steps of the flowcharts may be deleted without affecting the scope of the present disclosure.

The above-described embodiments include various examples. Although all possible combination for describing the various examples have not been described, those of ordinary skill in the art may appreciate that other combinations are possible. Accordingly, the present disclosure should be construed to include all other replacements, modifications, and changes which fall within the scope of the claims.

The disclosed embodiments may be described in terms of functional block components and various processing steps. Such functional blocks may be realized by any number of hardware and/or software components configured to perform the specified functions. For example, the disclosed embodiments may employ various integrated circuit (IC) components, e.g., memory elements, processing elements, logic elements, look-up tables, and the like, which may carry out a variety of functions under control of one or more microprocessors or other control devices. Similarly, where the elements of embodiments are implemented using software programming or software elements, embodiments may be implemented with any programming or scripting language such as C, C++, Java, assembly code, or the like, with various algorithms implemented with any combination of data structures, objects, processes, routines, or other programming elements. Functional aspects may be implemented in algorithms that are executed by one or more processors. Furthermore, the disclosed embodiments could employ any number of conventional techniques for electronics configuration, signal processing and/or control, data processing, etc. The terms "mechanism," "element," "means," and "configuration" are not limited to mechanical and physical configurations. Such terms may have the meaning of a series of routines of software in association with a processor or the like.

While the present disclosure has been particularly shown and described with reference to certain embodiments thereof, it will be understood by those of ordinary skill in the art that various changes in form and details may be made therein without departing from the spirit and scope of the present disclosure as defined by the following claims and any equivalents thereof.

What is claimed is:

1. A method in which a terminal provides a mission critical video (MCVideo) service, the method comprising:
transmitting, by the terminal included in an MCVideo group, a discovery announcement message of the terminal to at least one other terminal included in the MCVideo group, wherein the discovery announcement message includes at least one of an MCVideo group identifier (ID), a category of the terminal and a video capability of the terminal;
receiving a discovery announcement message of each of the at least one other terminal included in the MCVideo group from each of the at least one other terminal; and
acquiring information about a presence and a capability of the at least one other terminal based on the received discovery announcement message.

2. The method of claim 1, further comprising:
determining a back-off time for transmitting the discovery announcement message, based on at least one of a preconfigured value and a reception frequency of a discovery announcement message of the other terminal received before transmitting the discovery announcement message,
wherein the discovery announcement message is transmitted after the determined back-off time.

3. The method of claim 1, further comprising:
broadcasting a probe message to search for the other terminal capable of communicating with the terminal;
receiving a discovery announcement message of the other terminal capable of communicating with the terminal in response to the probe message; and
acquiring information about a presence and a capability of the other terminal based on the discovery announcement message received in response to the probe message.

4. The method of claim 3, wherein the discovery announcement message of the other terminal is received after a lapse of a back-off time determined based on at least one of a preconfigured value of the other terminal and a reception frequency of a previously received discovery announcement message.

5. The method of claim 3, wherein transmitting the probe message comprises one of unicasting or broadcasting the probe message.

6. The method of claim 1, further comprising:
transmitting a group communication probe message for confirming whether group communication of at least some terminals included in a same group as the terminal is performed;
setting a first media plane, based on a first group communication announcement message received in response to the group communication probe message; and
performing group communication with the at least some terminals according to the set media plane.

7. The method of claim 6, further comprising:
transmitting a second group communication announcement message of the terminal when there is no group communication in progress; and
when a second media plane according to the transmitted second group communication announcement message of the terminal is set in another terminal that has received the second group communication announcement message of the terminal, receiving a third group communication announcement message of the other terminal in which the second media plane has been set.

8. The method of claim 6, wherein the first group communication announcement message of another terminal is received after a lapse of a back-off time determined based on at least one of a preconfigured value of the other terminal in which the first media plane has been set and a reception frequency of a previously received discovery announcement message.

9. The method of claim 6, further comprising, when information of the terminal is updated, transmitting a second group communication announcement message comprising the updated information, wherein setting of the first media plane of the group communication is changed based on the second group communication announcement message comprising the updated information.

10. A terminal for providing a mission critical video (MCVideo) service, the terminal comprising:
a transceiver; and
a processor configured to:
control the transceiver to transmit a discovery announcement message of the terminal included in an MCVideo group to at least one other terminal included in the MCVideo group, wherein the discovery announcement message includes at least one of an MCVideo group identifier (ID), a category of the terminal and a video capability of the terminal,
control the transceiver to receive a discovery announcement message of each of the at least one other terminal included in the MCVideo group from each of the at least one other terminal, and
acquire information about a presence and a capability of the at least one other terminal, based on the received discovery announcement message.

11. The terminal of claim 10, wherein the processor is further configured to:
determine a back-off time for transmission of the discovery announcement message, based on at least one of a preconfigured value and a reception frequency of a discovery announcement message of the other terminal received before transmitting the discovery announcement message,
wherein the discovery announcement message is transmitted after the determined back-off time.

12. The terminal of claim 10, wherein the processor is further configured to:
control the transceiver to broadcast a probe message for searching for the other terminal capable of communicating with the terminal,
control the transceiver to receive a discovery announcement message of the other terminal capable of communicating with the terminal, in response to the probe message, and
acquire information about a presence and a capability of the other terminal, based on the discovery announcement message received in response to the probe message.

13. The terminal of claim 12, wherein the third discovery announcement message of the other terminal is received after a lapse of a back-off time determined based on at least one of a preconfigured value of the other terminal and a reception frequency of a previously received discovery announcement message.

14. The terminal of claim 10, wherein the processor is further configured to:

control the transceiver to unicast a probe message for searching for a third terminal capable of communicating with the terminal,
control the transceiver to receive a third discovery announcement message from the third terminal in response to the probe message, and
acquire information about a presence and a capability of the third terminal, based on the third discovery announcement message received in response to the probe message.

15. The terminal of claim 10, wherein the processor is further configured to:
control the transceiver to transmit a group communication probe message for determining whether a group communication from at least one terminal included in a same group as the terminal is performed,
set a first media plane, based on a first group communication announcement message received in response to the group communication probe message, and
perform the group communication with the at least one terminal according to the set first media plane.

16. The terminal of claim 15, wherein the processor is further configured to:
control the transceiver to transmit a second group communication announcement message from the terminal, when there is no group communication being performed, and
control the transceiver to receive a third group communication announcement message from a third terminal, when a second media plane according to the second group communication announcement message of the terminal is set in the third terminal that has received the second group communication announcement message of the first terminal.

17. The terminal of claim 16, wherein the third group communication announcement message from the third terminal is received after a lapse of a back-off time determined based on at least one of a preconfigured value of the third terminal in which the second media plane has been set and a reception frequency of a previously received discovery announcement message.

18. The terminal of claim 15, wherein the processor is further configured to control the transceiver to transmit a second group communication announcement message including updated information when information of the terminal is updated, and
wherein setting of the first media plane from the group communication is changed based on the second group communication announcement message including the updated information.

19. A non-transitory computer-readable recording medium having a program recorded thereon for executing the method of claim 1.

* * * * *